United States Patent [19]

Johnson

[11] Patent Number: 5,634,290
[45] Date of Patent: Jun. 3, 1997

[54] DEVICE AND METHOD FOR MAKING A FISHING LURE

[76] Inventor: Floyd H. Johnson, 1212 Burch, Mt. Pleasant, Mich. 48858

[21] Appl. No.: 665,917

[22] Filed: Jun. 19, 1996

[51] Int. Cl.$^6$ .................................................. H01K 85/12
[52] U.S. Cl. .................... 43/42.19; 43/44.9; 43/42.53; 29/241; 289/17; 289/1.5
[58] Field of Search ................... 43/1, 4, 42.14, 43/42.15, 42.19, 44.9, 42.53; 223/48; 29/241, 433; 289/1.5, 17

[56] References Cited

U.S. PATENT DOCUMENTS

| | | | |
|---|---|---|---|
| 2,584,231 | 2/1952 | Schmidt | 29/241 |
| 2,621,437 | 12/1952 | Pedranti | 43/42.19 |
| 2,785,496 | 3/1957 | Menkens | 43/42.19 |
| 3,043,615 | 7/1962 | Dannebaum | 43/1 |
| 3,056,229 | 10/1962 | Haney | 43/44.87 |
| 3,067,499 | 12/1962 | Shaw | 29/241 |
| 3,131,957 | 5/1964 | Musto | 289/17 |
| 3,604,140 | 9/1971 | Nelson | 43/42.19 |
| 3,803,749 | 4/1974 | Boyum | 43/44.9 |
| 5,142,811 | 9/1992 | Freeman | 43/42.53 |
| 5,197,220 | 3/1993 | Gibbs et al. | 43/42.09 |
| 5,241,774 | 9/1993 | Rayburn | 43/42.9 |
| 5,327,670 | 7/1994 | Tallerico | 43/42.14 |

FOREIGN PATENT DOCUMENTS

| | | | |
|---|---|---|---|
| 480461 | 4/1916 | France | 43/44.9 |
| 249811 | 5/1948 | Switzerland | 43/44.9 |

*Primary Examiner*—Jeanne Elpel
*Attorney, Agent, or Firm*—Learman & McCulloch

[57] ABSTRACT

A harness lure tying device comprises a plurality of beads and a spinner disposed on a shaft having an axial bore therethrough and removable retainers at opposite ends of the shaft. The removal of one or the other retainers permits the beads and spinner to be slid onto and off the shaft into and out of engagement with a leader line during the tying of a harness lure or the replacement of the beads and blade of a harness for those of another.

21 Claims, 3 Drawing Sheets

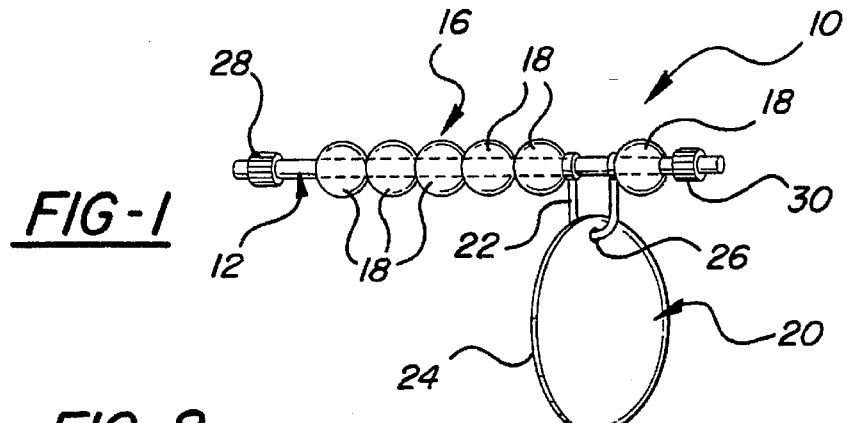
FIG-1
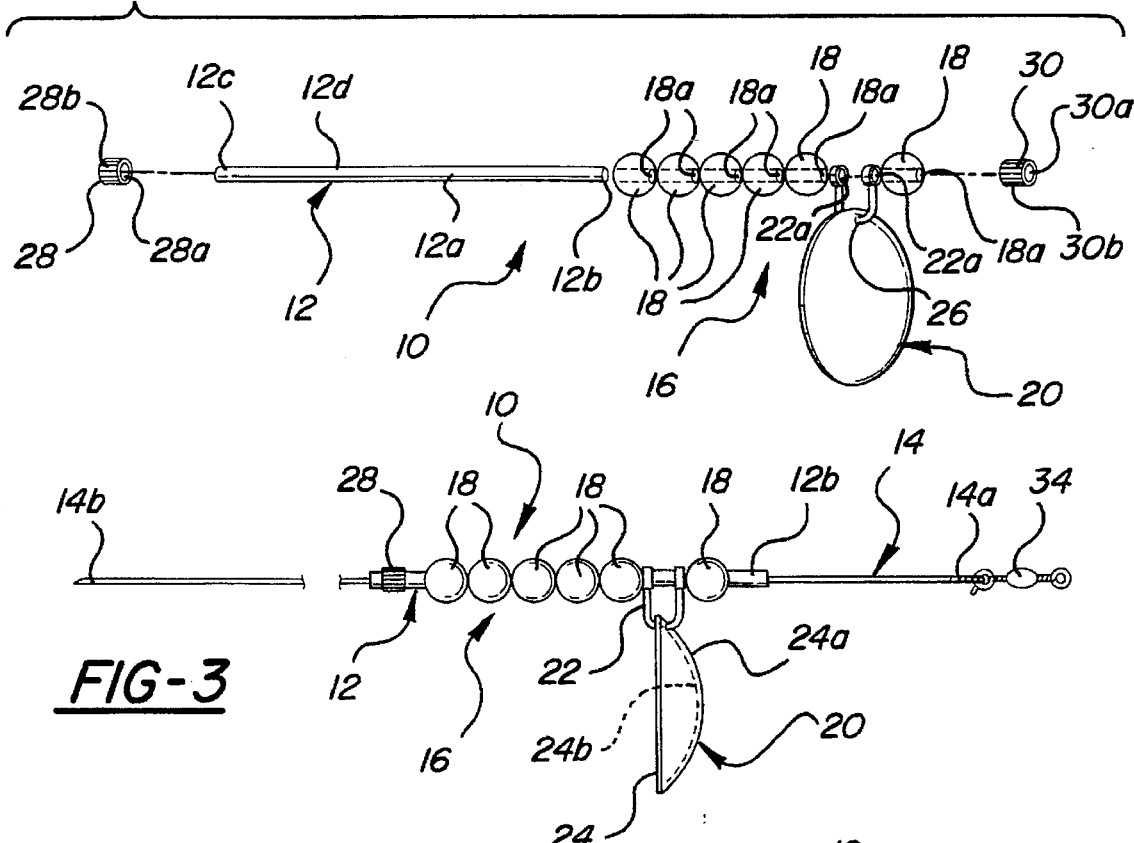
FIG-2
FIG-3
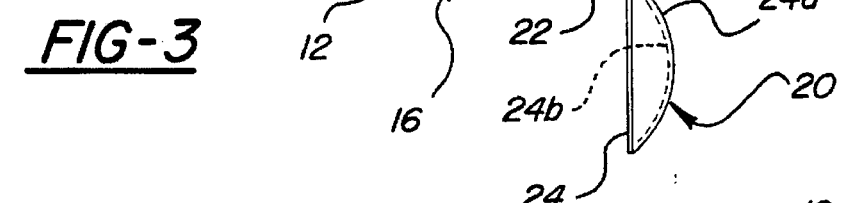
FIG-4
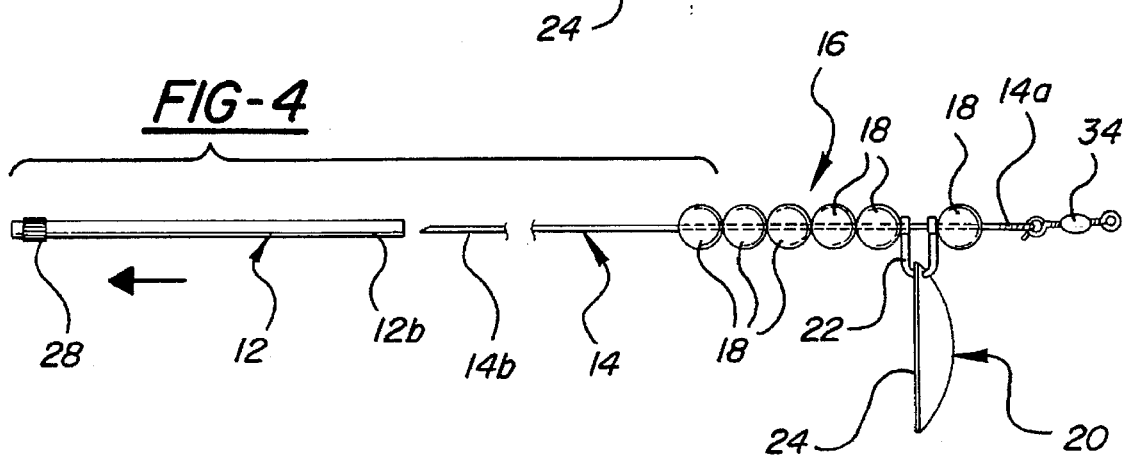

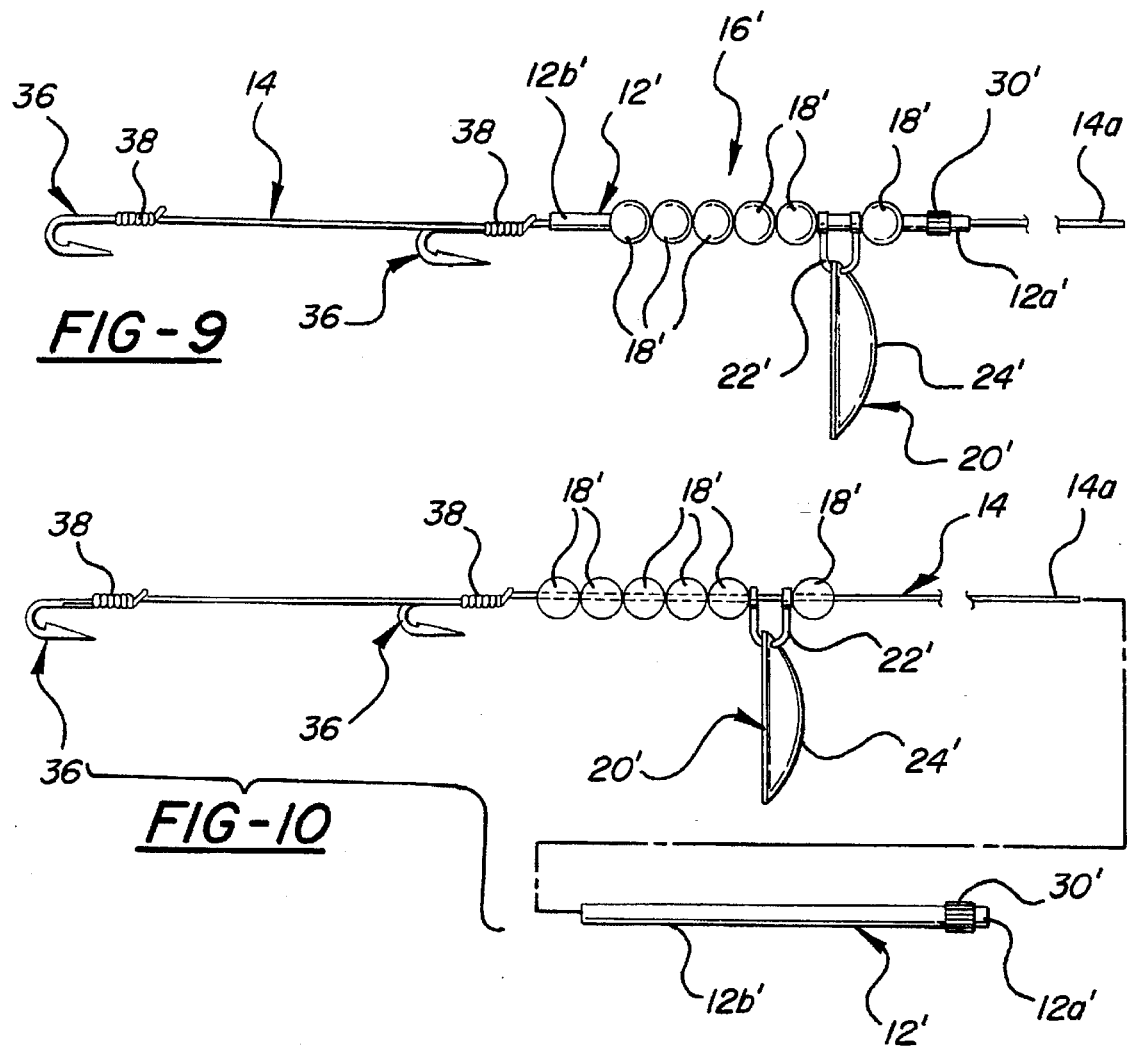
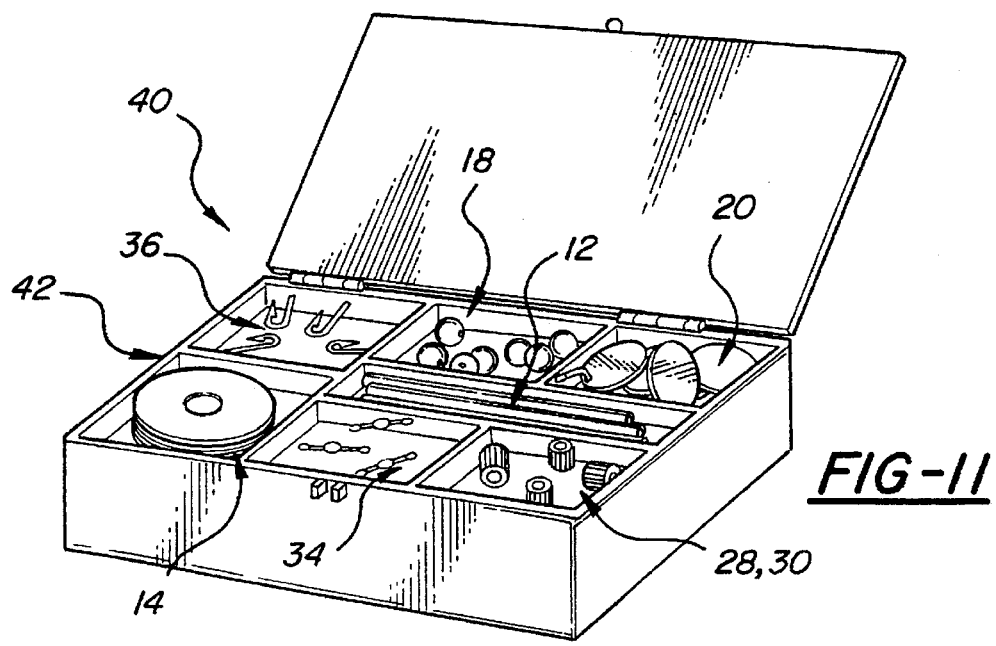

5,634,290

DEVICE AND METHOD FOR MAKING A FISHING LURE

This present invention relates generally to fishing tackle and more particularly to lures having replaceable line attachments and to devices employed to assist in the interchanging of such attachments.

BACKGROUND OF THE INVENTION

Various lures are available on the market for use by fisherman to catch game fish. One such type is a "crawler harness" or simply a "harness" wherein a leader is strung with an artificial bait comprising a plurality of beads and a spinner. The bait is captured on the leader by a connector secured at the leading end of the leader and one or more hooks secured to the trailing end of the leader.

Some fisherman purchase pre-made harnesses while others prefer to tie there own. In either case, it is desirable for a fisherman to have on hand a number of such lures with different bait combinations so that he may change lures in response to changing conditions. Those who purchase pre-tied harnesses or tie their own in advance of a fishing outing often carry several of such pre-tied harnesses in their tackle box until ready for use. However, storing several of the harnesses together in the assembled condition tends to cause the hooks to become entangled. Another disadvantage of pre-tied harnesses is that the fisherman is limited in his selection of artificial bait combinations to those of the pre-tied harnesses on hand.

In an effort to avoid the foregoing problems, some fisherman choose to carry a variety of beads of different shapes and colors along with the other components that make up the harness in an unassembled condition and then tie them as needed during the course of fishing. This, however, has heretofore necessitated the stringing of the individual beads and spinners onto the leader which is very tedious and time consuming, particularly under adverse conditions such as poor light or extreme cold. Consequently, fisherman often neglect to change the harness they are fishing because they lack the desired pre-tied bait combination and the changing of the bait or the tying of a new harness is too troublesome.

U.S. Pat. No. 2,621,437 discloses a harness-type fish lure wherein the beads and spinner device are disposed on a tube formed with outwardly flared end portions retaining the beads permanently on the tube such that the tube remains with the artificial bait when threaded onto the leader. Although this may simplify the assembling of a harness by eliminating the need to handle the beads individually, the presence of the tube adds to the cost and weight of the harness and restricts the freedom of movement of the bait as compared to when it is strung directly on the leader line, which may possibly inhibit it effectiveness. Also, the permanent end flanges of the tube prevents the fisherman from being able to change the bait combination on the tube for that of another.

SUMMARY OF THE INVENTION AND ADVANTAGES

A fishing lure harness tying device constructed in accordance with the present invention comprises a shaft having opposite ends and an axial bore of a diameter enabling the shaft to be slid onto and off of a leader line. An artificial bait such as a combination of beads and a spinner is provided having a circumferentially continuous inner wall defining an axial passageway enabling the bait to be slid onto and off of the shaft. A pair of retainers are mounted on the ends of the shaft to retain the bait against removal while supported on the shaft.

To tie an initial harness, a connector such a swivel or loop is secured to the leading end of a leader. The fisherman may preassemble several different artificial bait combinations by sliding each onto an associated shaft tube and holding them temporarily in place by disposing removable retainers on the ends of the shafts.

A selected one of the bait combinations is disposed on the leader by removing the retainer from the leading end of the shaft on which it is held and then sliding the leading end of the shaft onto the leader. The bait is then slid off the shaft and onto the leader and the shaft thereafter slid off of the leader. At least one hook is then attached to the trailing end of the leader capturing the bait on the leader between the hook and connector.

In most cases, the hook will be secured by a snell knot and according to a further feature of the invention, the shaft may be utilized to assist in the tying of the snell knot. When so used, the trailing end of the leader is first passed through the eye of the hook and the shaft placed along side the shank of the hook. The fisherman then winds the trailing end section of the leader several times about the shank and shaft and passes the trailing end of the leader through the bore of the tube. A tension force is then applied to the trailing end of the leader while the shaft is withdrawn to constrict the winds tightly about the shank of the hook, thereby completing the snell knot. Additional hooks may be attached in the same manner.

If during the course of fishing the user wishes to change the artificial bait combination for that of another, he simply cuts the leader at its leading end to remove the connector, slides the old bait combination off of the leader, removes the retainer from the trailing end of the shaft on which the desired bait combination is held, slides that end of the shaft onto the leader, slides the new bait combination off the shaft and onto the leader, afterwhich the shaft is slid off the leader and the connector reattached to the leading end of the leader.

A primary advantage of the present invention is that a fisherman is able to preassemble his own selected bait combinations prior to a fishing outing which may or may not be available commercially. These bait combinations are retained on their own shafts and may be stored in a tackle box until ready for use. This allows those fisherman who prefer to pre-tie or purchase pre-made harnesses to carry just a couple in their tackle box rather than having an entire selection of bait combinations. If during the course of fishing the conditions change, the fisherman may change his bait combination in the manner described above by simply cutting the leader behind the connector, removing the old bait combination and installing the new one afterwhich the connector is reattached. The device thus provides a handy way for fisherman to handle and install different bait combinations eliminating the need to string beads individually.

According to another feature of the invention, a harness lure tying kit is provided comprising an assortment of plastic beads and spinner devices formed with central axial passageways, at least one of the aforementioned shafts and at least an associated pair the aforementioned retainers that, when removed, enable a selected bait combination to be slid onto and off the shaft and when attached secure the bait combination releasably in place on the shaft.

THE DRAWINGS

These and other features, objects and advantages of the present invention will be more fully understood and appreciated by those skilled in the art when considered in connection with the following detailed description and accompanying drawings, wherein:

FIG. 1 is a perspective view of a fishing lure making device constructed to a presently preferred embodiment of the invention;

FIG. 2 is an exploded perspective view of the device of FIG. 1;

FIG. 3 is a side elevational view showing a stage in the making of the lure;

FIG. 4 is a view like FIG. 3 but showing the shaft being removed from the leader in another stage in the making of the lure;

FIGS. 9 and 10 illustrate the installation of a new bait combination on the leader; and FIG. 11 is a schematic perspective view of a harness lure tying kit for use in tying harness lures like that of FIG. 7.

DETAILED DESCRIPTION

Figure 5:
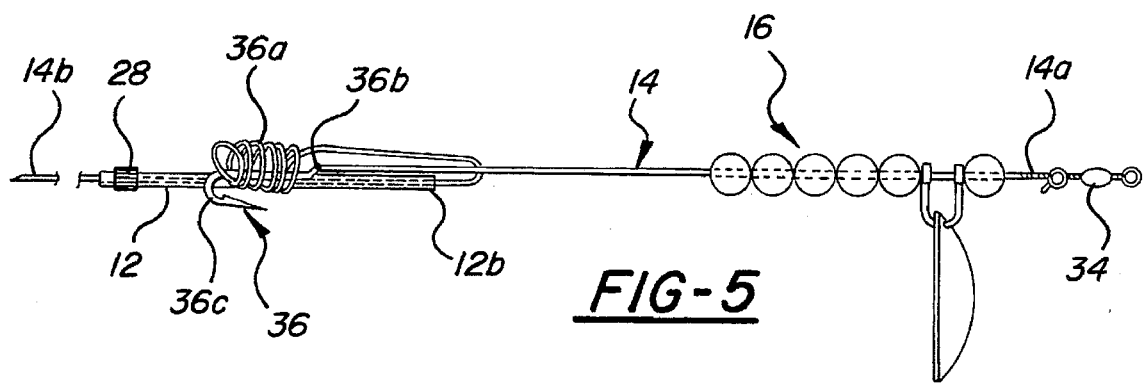
FIGS. 5-7 illustrate the manner in which the shaft can be used to assist in the tying of one or more hooks onto the trailing end of the leader.

FIGS. 1 and 2 illustrate a fishing lure harness tying device 10 according to a presently preferred embodiment of the invention wherein the device 10 comprises an elongate substantially non-collapsible tubular shaft 12 formed with an axial bore 12a extending the length of the shaft between an open leading end 12b and an open trailing end portion 12c of the shaft 12. The shaft 12 may be made of a suitable rigid or semi-rigid thin walled material such as brass or plastic tubing. The wall of the shaft 12 is preferably circumferentially continuous along its length and the bore 12a is of a diameter enabling the diameter shaft 12 to be slid onto a leader 14. In the preferred embodiment, the shaft 12 comprises a length of brass tubing having a constant inside diameter of about 0.03 inches but may be more or less as long as the bore 12b is able to accommodate the passage of the leader 14 therethrough.

An artificial bait 16 is disposed on the shaft 12 and comprises a plurality of beads 18 and a spinner device 20, preferably standard beads and spinner devices of the type commonly used in the fish lure industry in making harness lures. The beads 18 are preferably made of molded plastics material available commercially in a wide range of colors and shapes each having a circumferentially continuous inner wall defining a passageway 18a through the beads of the fixed inner diameter which, by standard, is about 0.06 inches and outer diameter of about 0.25 inches. The beads 18 are unslotted along their length such that the passageway 18a is substantially closed in the radial direction along the length of the passage 18a enabling the beads 18 to be self supporting on the leader 14.

The spinner device 20 includes a generally U-shaped clevis 22 formed with a pair of eyelets defining aligned passageways on the ends of the leg portions thereof that are of the same standard size as the passageways 18a of the beads 18 for accommodation of the leader 14. A blade 24 of conventional design has an aperture 26 through which the clevis 22 extends to support the blade 24 for rotation with the clevis 22 about the leader 14 when the lure is drawn through the water. It should be noted at this time that the blade 24 is directional by virtue of its cupped shape. To spin properly when drawn through the water, the convex side 24a of the blade must face forwardly when drawn through the water and the concave side 24b must face rearwardly.

Accordingly, the device 10 can be said to have a leading end 12b of the shaft and a trailing end 12c of the shaft with respect to the direction of the bait 16, as shown in the drawings.

The shaft 12 has an outer surface 12d that is preferably cylindrical and uniform in diameter along its length and sized in relation to the diameter of the passageways 18a of the beads and the eyelets 22a of the clevis to enable the beads 18 and spinner device 20 to be slid onto and off of the shaft 12 from either end 12b, 12c thereof. It is preferred that the shaft 12 have an outer diameter equal to or slightly less that 0.06 inches so that the beads 18 slide freely off of the shaft 12 under their own weight when the shaft 12 is tilted.

A pair of retainers 28, 30 are removably accommodated on the leading and trailing ends 12b, 12c of the shaft 12, respectively, for temporarily holding the bait 16 on the shaft 12 when the retainers 28, 30 are in place. The retainers 28, 30 may be removed individually to enable the artificial bait 16 to be slid onto and off of the tube 12 from either end when needed. The retainers 28, 30 are preferably identical in construction and each fabricated from a short length of elastomeric plastics or rubber sleeve material having inner diameters 28a, 30a, that are less than the outer diameter of the shaft 12 when in the unflexed condition and preferably about 0.03 inches. The sleeves 28, 30 expand when slid onto the ends of the shaft 12, imparting a constricting frictional gripping force sufficient to hold the sleeves 28, 30 in place until such time as they are slid off of the shaft 12 by a bodily pulling force applied by the fisherman. The gripping force may be increased or decreased by decreasing or increasing, respectively the inner diameter of the sleeves 28, 30. The sleeves 28, 30 have a preferred length in the range of 0.06 inches to 0.15 inches and more preferably are about 0.12 inches. The sleeves 28, 30 preferably have a plurality of circumferentially spaced longitudinally extending splines 28b, 30b extending their length to enhance the fisherman's ability to grasp the sleeves 28, 30.

While the particular retainer construction above is preferred, it is to be understood that other retainer designs are contemplated by the invention provided they retain the bait 16 releasably on the shaft 12 when installed and enable the bait 16 to be slid off of the ends of the shaft when removed. They may, for example, be threaded onto the ends of the shaft.

Figure 6:
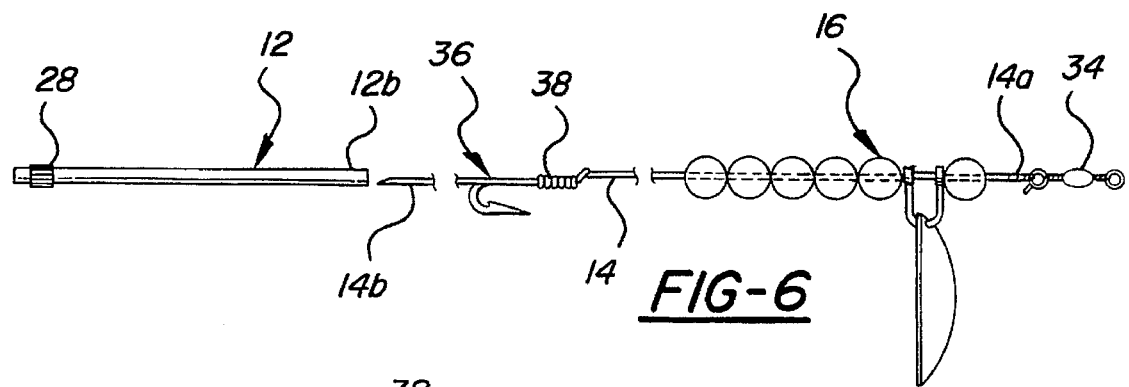
Figure 7:
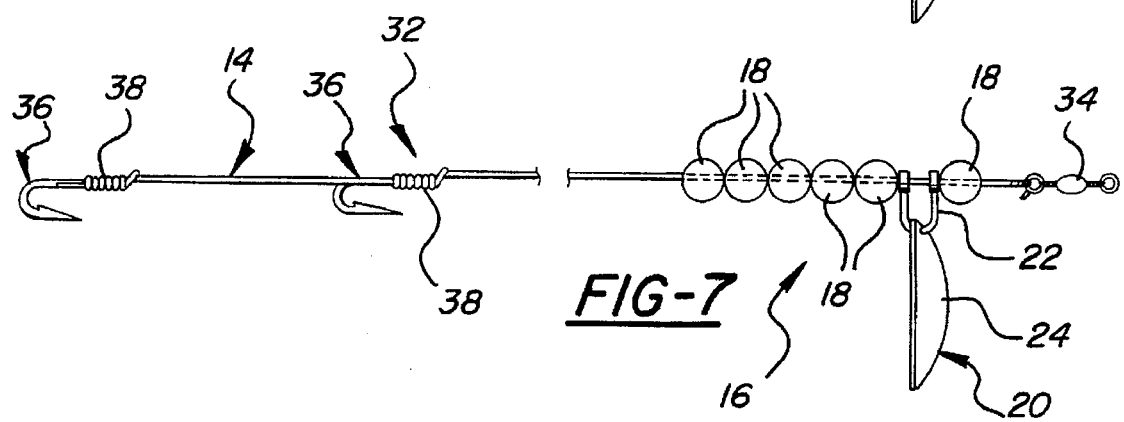

FIGS. 3-7 illustrate the preferred method of utilizing the device 10 to tie what is commonly referred to in the fishing tackle art as a "crawler harness" or simply a "harness", indicated generally at 32 in FIG. 7. According to the preferred method, a connector 34 is provided at the leading end 14a of the leader 14 and may comprise a conventional swivel, as shown or other means such a loop (not shown) formed at the leading end 14a serving to connect the harness 32 to the primary line (not shown) that extends to the fishing rod/reel in a manner well know to a fisherman.

Once the connector 34 is secured, the retainer 28 is removed from the leading end 12b of the shaft 12 to unblock that end of the shaft 12, and the shaft then threaded, leading end first, onto the leader 14 such that the leader 14 passes through the bore 12a of the shaft in the manner illustrated in FIG. 3. The shaft 12 may then be tilted causing the bait 16 to slide off the leading end 12b of the shaft 12 and directly onto the leader 14, as illustrated in FIG. 4. As also illustrated in FIG. 4. once the bait 16 has been slid off the shaft 12, the shaft 12 is then slid off the trailing end 14c of the leader 14.

One or more conventional hooks 36 of the type having an elongated shank 36a terminating at its leading in an eye 36b and at its trailing end in a barbed hook section 36c may then be secured to the leader 14 preferably by a snell knot 38, as illustrated in FIG. 5–7 with the assistance of the shaft 12. As shown in FIG. 5, the shaft 12 is placed along side the shank 36a and the trailing end 14b of the leader 14 is passed initially through the eye 36b of the hook 36 and then wrapped several times about the shank 36a and shaft 12 afterwhich it is brought forward and then passed completely through the bore 12a of the shaft 12. A tension force is then applied to the trailing end 14b of the leader causing the wound portion of the leader to constrict. Prior to full tightening, the shaft 12 is slid off the trailing end 14b of the leader, as illustrated in FIG. 6, afterwhich the leader 14 is pulled taught to snell the hook 36 on the leader 14, as shown. The same process may be repeated to attach one or more additional hooks to the leader 14 behind the forward-most hook, as illustrated in FIG. 7. The bait 16 is captured on the leader 14 and free to slide between the connector 34 and the forward-most hook 36.

While the connector 34 has been described as being attached to the leader first and the hooks 36 last, those skilled in the art of tying harnesses will appreciate that the steps could be reversed such that the hooks 36 would be first tied to the trailing end 14b of the leader 14, the bait 16 installed by removing the retainer 30 this time from the trailing end 12c of the shaft 12 onto the leading end 14a of the leader 14, sliding the bait 16 off the shaft 12 and onto the leader 14, removing the shaft 12, and then attaching the connector 34 to achieve the same result as that shown in FIG. 7.

Figure 8:
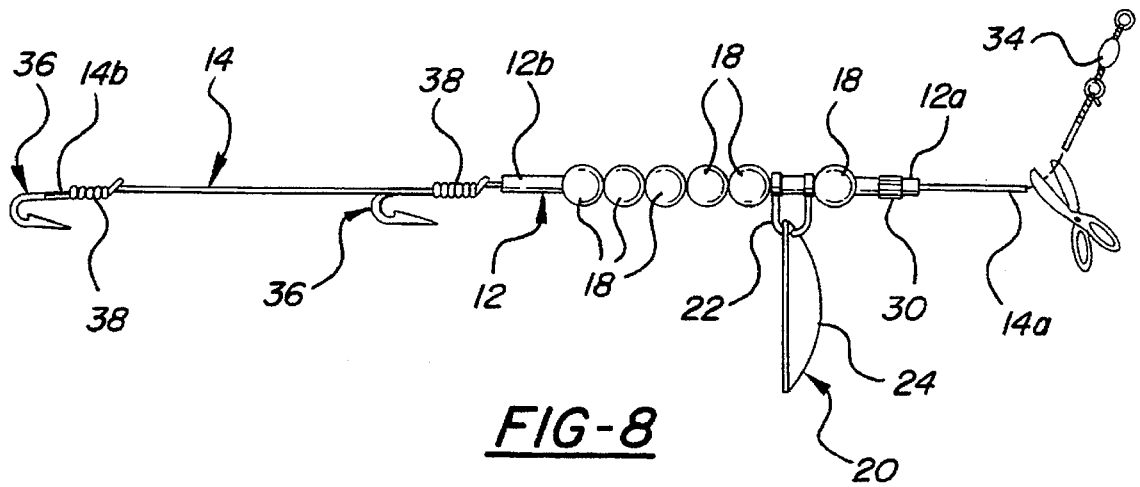
FIG. 8 is a side perspective view illustrating the manner of removing an existing bait combination from the leader in preparation for its replacement by a new bait combination.

Once the harness 32 is assembled, the fisherman may later exchange the bait 16 of the harness for that of another in the manner illustrated in FIGS. 8–10. As shown in FIG. 8, the leader 14 is first cut at its leading end 14a to remove the connector 34. The shaft 12, having the connector 30 removed from its trailing end 12c, is slid onto the leader 14 and in turn the bait 16 slid onto the shaft 12 as shown and together the shaft 12 and bait 16 slid off of the leading end 14a of the leader 14 and the retainer 30 reinstalled to secure the bait 16 on the shaft 12 until further use. A replacement device 10' of generally the same construction as that of device 10 except for having a new bait combination 16' is shown in FIG. 9. The combinations of bait 16' may differ from the bait 16 that was removed in any of a number of ways, including color, size, arrangement, number, etc. of the beads 18' and spinner device 20'. The replacement bait 16' is disposed on an identical shaft 12' having identical retainers or end caps 28', 30' secured to its leading and trailing ends 12b', 12c'.

The replacement bait 16' is installed by removing the retainer 30' from the trailing end 12c' of the shaft 12' and sliding the shaft 12' onto the leading 14a of the leader 14, as illustrated in FIG. 9. As shown in FIG. 10, the replacement bait 16' is then slid off the trailing end 12c' of the shaft 12' directly onto the leader 14 and the shaft 12' thereafter removed and the connector 34 reattached.

It will be appreciated that the fisherman may have several different replacement bait combinations on hand each supported on its own shaft an held by removable retainers on the ends of the shafts as described above, enabling the fisherman to readily exchange one bait for another during the course of fishing.

The present invention also provides a harness tying kit, illustrated in FIG. 11, which comprises the various components that are needed for assembling the harness 32. The kit 40 may comprise an assortment of beads 18, spinner devices 20, hooks 36, connectors 34, a spool of leader line material 14, as well as one or more of the shafts 12 and retainers 28, 30 described above which may be stored in a compartmented box 42.

While the invention has been described in terms of specific preferred embodiments thereof, they are intended to be illustrative of the invention rather than definitive thereof. The invention is defined in the appended claims which contemplate any and all of the embodiments within the scope and spirit of the invention.

I claim:

1. A fishing lure harness tying device, comprising:
   a shaft having opposite ends and an axial bore of a diameter enabling said shaft to be slid onto and off of a leader line;
   an artificial bait having a circumferentially continuous inner wall defining an axial passageway through said bait of a diameter enabling said bait to be slid onto and off of said shaft; and
   a pair of retainers mounted on said ends of said shaft to retain said bait releasably on said shaft, said retainers being removable individually from said shaft to enable said bait to be slid onto and off of said shaft from either of said ends thereof, whereby said bait is attachable to the leader by removing a selected one of said retainers from an end of said shaft to unblock said end, sliding said unblocked end of said shaft onto the leader, sliding said bait off of the unblocked end of said shaft directly onto the leader, and thereafter sliding said shaft off of the leader.

2. The device of claim 1 wherein said retainers comprise tubular resilient sleeve members having axial bores of a diameter slightly less than the outer diameter of said shaft engaging said shaft with frictional force sufficient to retain said sleeve members in position on said shaft while enabling said sleeves to be slid off of said ends of said shaft in response to application of a bodily pulling force on said sleeves.

3. The device of claim 2 wherein said sleeves include circumferentially spaced external splines extending the length of said sleeves.

4. The device of claim 1 wherein said shaft has an outer cylindrical surface of generally uniform diameter.

5. The device of claim 4 wherein said outer diameter of said shaft is about 0.06 inches.

6. The device of claim 5 wherein said bore of said shaft has a diameter of about 0.03 inches.

7. The device of claim 5 wherein said passageway of said bait is slightly larger than said outer diameter of said shaft such that said bait is slidable along said shaft.

8. The device of claim 1 wherein said bait comprises a plurality of individual beads.

9. The device of claim 1 wherein said bait includes a plurality of individual beads, a U-shaped clevis, and a blade carried by said clevis.

10. A method of tying a harness lure for fishing, comprising:
    obtaining a length of flexible leader line having leading and trailing ends thereof;
    obtaining a harness tying device comprising a first elongate tubular shaft having opposite leading and trailing ends and an axial bore between said ends of a diameter enabling the shaft to be slid onto and off of the leader line, a first selected artificial bait supported on said shaft having a circumferentially continuous inner wall defining an axial passageway along the length of the bait, and a pair of removable retainers supported on the ends of the shaft;

in a selected order, attaching a connector to the leading end of the leader and a fish hook to the trailing end of the leader;

prior to the attachment of the latter of said connector and said hook to said leader, removing a selected one of the retainers from a first end of the shaft, sliding the first end of the shaft onto the leader, sliding the bait off the first end of the shaft and directly onto the leader, and thereafter sliding the shaft off of the leader thereby to dispose the bait on the leader.

11. The method of claim 10 wherein the connector is attached to the leader prior to attaching the hook and the first end of the shaft comprises its leading end.

12. The method of claim 11 wherein the hook has a shank formed with an eye at a leading end thereof and is attached to the leader by a snell knot tied with the assistance of the shaft by passing the trailing end of the leader through the eye of the hook so that a trailing length of leader extends beyond the hook, positioning the shaft along side the shank of the hook, wrapping a portion of the trailing length of leader several times about the shaft and shank, passing the trailing end of the leader through the bore of the shaft, and thereafter applying a tension force to the trailing end of the leader and sliding the shaft from the leader to tighten the wrapped portion about the shank thereby securing the hook to the leader.

13. The method of claim 11 wherein the bait is directional and is arranged initially on the shaft with leading and trailing ends of the bait adjacent the leading and trailing ends of the shaft, respectively.

14. The method of claim 13 including obtaining a second harness tying device of the same construction as the harness tying device of claim 13 defining a second like shaft, a second selected bait, and a second like pair of removable retainers on the shaft; and changing the first selected bait on the leader for the second selected bait by detaching the connector from the leading end of the leader, removing the first selected bait from the leader, removing the retainer from a trailing end of the second shaft, sliding the trailing end of the second shaft onto the leading end of said leader, sliding the second selected bait off of said shaft and onto the leader, and thereafter sliding said second shaft off of the leader and reattaching said connector to the leading end of said leader to capture said second selected bait on said leader.

15. The method of claim 14 wherein the removal of said first selected bait in claim 14 is carried out with the assistance of the shaft of the first tying device by removing the retainer from a trailing end of said first shaft, sliding the trailing end of said first shaft onto the leading end of the leader, sliding the first selected bait onto the first, and thereafter sliding said first shaft and said first selected bait off of the leader as a unit and reattaching the retainer to the trailing end of said first shaft.

16. The method of claim 10 wherein the bait includes a plurality of beads, a clevis and a blade carried on the clevis.

17. The method of claim 10 including preparing a variety of interchangeable baits by selecting combinations of plastic beads and spinner devices, sliding each selected combination onto a respective shaft like that of said first shaft, and securing the prepared bait combinations on their shafts by attaching removable retainers on the ends of the shafts; and interchanging the bait on the leader for a selected different one of the prepared bait combinations by detaching the connector from the leading end of the leader, removing the first bait from the leader, removing the retainer from the trailing end of the shaft on which the selected bait combination is disposed, sliding a trailing end of said shaft onto the leading end of said leader, sliding the selected bait combination off of said shaft and onto the leader, and thereafter sliding said shaft off of the leader and reattaching said connector to the leading end of said leader to capture said selected bait combination on said leader.

18. A harness lure tying kit, comprising: artificial bait including an assortment of plastic beads and spinner devices that can be arranged in any of a number ways to provide a variety of bait combinations, said beads having central axial passageways of predetermined diameter therethrough that open at their opposite ends and are substantially closed between said ends enabling said beads to be self-supporting on a leader line;

at least a first elongate tubular shaft having opposite ends and an outer surface of a diameter no larger than the diameter of said passageways of said beads enabling a selected one of said variety of bait combinations to be slid onto and off of said ends of said shaft, said shaft further having an axial bore extending between said ends of a diameter enabling said shaft to slide onto and off of a leader line; and at least a pair of retainers removably disposable on said opposite ends of said first shaft securing said selected bait combination on said shaft when said retainers are disposed on said ends of said shaft while enabling said selected bait combination to be slid off of and onto said shaft from a selected one of said ends of said shaft upon the removal of the associated said retainer from said selected end of said shaft.

19. The kit of claim 18 wherein there are a plurality of said shafts and associated said retainer pairs.

20. The kit of claim 18 wherein said assortment of said beads includes a plurality of individual beads of a variety of different colors.

21. The kit of claim 18 including leader line and fish hooks.

* * * * *